United States Patent
Sakata et al.

(10) Patent No.: US 7,693,524 B2
(45) Date of Patent: *Apr. 6, 2010

(54) RADIO ACCESS NETWORK APPARATUS AND MOBILE COMMUNICATION SYSTEM USING THE SAME

(75) Inventors: Masayuki Sakata, Tokyo (JP); Masahiko Kojima, Tokyo (JP); Naoto Itaba, Tokyo (JP)

(73) Assignee: NEC Corporation, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 11/524,749

(22) Filed: Sep. 21, 2006

(65) Prior Publication Data

US 2007/0015540 A1      Jan. 18, 2007

Related U.S. Application Data

(63) Continuation of application No. 10/441,185, filed on May 20, 2003, now Pat. No. 7,164,917.

(30) Foreign Application Priority Data

May 29, 2002   (JP)   ............................. 2002-154889

(51) Int. Cl.
    *H04Q 7/20*   (2006.01)
(52) U.S. Cl. ........................ 455/445; 455/560; 455/442; 455/426.1; 455/438; 455/450; 455/422.1; 370/229; 370/331; 370/350; 370/354; 370/356
(58) Field of Classification Search .................. 455/560, 455/436, 442, 445, 438, 426.1, 422.1, 67.11; 370/331

See application file for complete search history.

(56) References Cited

U.S. PATENT DOCUMENTS 6,085,108 A * 7/2000 Knutsson et al. ............ 455/522

(Continued)

FOREIGN PATENT DOCUMENTS

WO         WO 98/48528        10/1998

(Continued)

OTHER PUBLICATIONS

IMT-2000, KRNET 2002 10$^{th}$ Korean Network Conference & Exhibition, LG Electronic [On-line] (May 2002) URL:cnscenter.future.co.kr/resource/rsc-center/presentation/kmet2001/E2-2.pdf [retrieved on Oct. 6, 2003].

(Continued)

*Primary Examiner*—Marceau Milord
(74) *Attorney, Agent, or Firm*—Foley & Lardner LLP

(57) ABSTRACT

The radio access network for allowing to construct a system abundant in scalability in a W-CDMA mobile communication system. A RNC in the radio access network is physically separated into a C plane control equipment for controlling signaling and a U plane control equipment for processing user data, where the user data is transferred between a mobile terminal and a host device via only the U plane control equipment and a control signal is terminated by the U plane control equipment and the C plane control equipment. This allows a system abundant in scalability to be constructed, and even in the case of soft handover across the C plane control equipments, also enables the continuous use of the same U plane control equipment, thereby eliminating the conventional connection path for connecting between RNCs and preventing delay due to passing through the RNCs.

33 Claims, 11 Drawing Sheets

U.S. PATENT DOCUMENTS

| | | | | |
|---|---|---|---|---|
| 6,321,092 | B1* | 11/2001 | Fitch et al. | 455/456.5 |
| 6,519,461 | B1* | 2/2003 | Andersson et al. | 455/453 |
| 6,650,905 | B1* | 11/2003 | Toskala et al. | 455/522 |
| 6,724,756 | B2* | 4/2004 | Fourie et al. | 370/360 |
| 6,760,303 | B1* | 7/2004 | Brouwer | 370/229 |
| 6,829,482 | B2* | 12/2004 | Rune et al. | 455/442 |
| 6,850,759 | B2* | 2/2005 | Van Lieshout et al. | 455/426.1 |
| 6,862,450 | B2* | 3/2005 | Mikola et al. | 455/438 |
| 6,889,050 | B1* | 5/2005 | Willars et al. | 455/452.2 |
| 6,909,887 | B2* | 6/2005 | Fauconnier et al. | 455/403 |
| 6,912,390 | B2* | 6/2005 | Andersson et al. | 455/436 |
| 6,928,304 | B2* | 8/2005 | Wigell et al. | 455/561 |
| 6,944,462 | B2* | 9/2005 | Riihinen et al. | 455/453 |
| 6,950,398 | B2* | 9/2005 | Guo et al. | 370/235 |
| 6,970,716 | B2* | 11/2005 | Rune et al. | 455/552.1 |
| 7,027,828 | B2* | 4/2006 | Kim et al. | 455/522 |
| 7,054,294 | B2* | 5/2006 | Magnusson | 370/335 |
| 7,072,656 | B2* | 7/2006 | Willars et al. | 455/436 |
| 7,177,658 | B2* | 2/2007 | Willenegger et al. | 455/522 |
| 7,184,710 | B2* | 2/2007 | Hogan | 455/67.11 |
| 7,522,526 | B2* | 4/2009 | Yi et al. | 370/236 |

FOREIGN PATENT DOCUMENTS

| | | |
|---|---|---|
| WO | WO 01/58086 A | 8/2001 |
| WO | WO 01/58086 A2 | 8/2001 |
| WO | WO 01/58086 A2 | 8/2001 |
| WO | WO 01/58187 A | 8/2001 |
| WO | WO 03/007637 | 1/2003 |

OTHER PUBLICATIONS

Universal Mobile Telecommunications System (UMTS); Radio Resource Control (RRC) protocol specification (3GPP TS 25.331 version 5.0.0 Release 5); ETSI TS 125 331; European Telecommunications Standards Institute, Sophia-Antipo, FR; published Mar. 2002; XP014005116.

Mobile Wireless Internet Forum, OpenRAN Architecture in 3$^{rd}$ Generation Mobile Systems Technical Report MTR-007 Release v1.0.0 Adopted and Ratified, Sep. 4, 2001.

Musikka N. et al.: "Ericsson's IP-based BSS and Radio Network Server" ON—Ericsson Review, Ericsson, Stockholm, SE, No. 4, 2000, pp. 224-233, XP002901766—ISSN: 0014-0171 * p. 233, middle column, line 1-line 28* *p. 225, left-hand column, line 1-line 49* *p. 226, right-hand column, line 26-line 50* *figure 3*.

"Universal Mobile Telecommunications System (UMTS): Radio Interface for Broadcast/Multicast Services (3GPP TR 25.925 version 3.4.0 Release 1999): ETSI TR 125 925" ETSI Standards, European Telecommunications Standards Institute, Sophia-Antipo, FR vol. 3-R2-, No. V340, Mar. 2001, pp. 0-31, XP014005116—ISSN: 000-0001 *p. 11, paragraph 6.3.1—p. 13, paragraph 6.3.1 * *figures 6.1, 6.3*.

European Search Report for European Patent Application No. 06112237.0 dated Jun. 28, 2006.

3$^{rd}$ Generation Partnership Project; Technical specification Group Access Network; Radio Interface Protocol Architecture (Release 5); 2GPP TS 25.301 V5.0.0 (Mar. 2003).

Universal Mobile Telecommunications System (UMTS); UTRAN Iub Interface: General Aspects and Principles (3GPP TS 24.430 version 5.0.0 Release 5); ETSI TS 125 430, vol. 3-R3, No. V5.0.0, Mar. 1, 2002, XP014009146, ETSI Standards, Lis, Sophia Antipolis Cedex, France.

N. Musikka et al., "Ericsson's IP-based BSS and Radio Network Server" ON-Ericsson Review, Stockholm. SE, No. 4, 2000, pp. 224-233, XP002901766—ISN 0014-0171; p. 233, middle column, line 1—p. 225, left-hand column, line 1-line 49, p. 226, right-hand column, line 26-line 50, Fig. 3.

IMT-2000, KRNET 2002 10$^{th}$ Korea Network Conference & Exhibition, LG Electronics [On-line] (May 2002) URL:cnscenter.future.co.kr/resource/rsc-center/presentation/kmet2001/E2-2.pdf [retrieved on Oct. 6, 2003).

* cited by examiner

EXISTING NETWORK CONFIGURATION AND FLOW
OF USER DATA AND CONTROL SIGNAL

NETWORK CONFIGURATION OF IP NETWORK

FLOW OF USER DATA AND CONTROL SIGNAL IN IP NETWORK
(NODE B INVOLVED IN SOFT HANDOVER HAS SELECTIVE
SYNTHESIS FUNCTION)

FLOW OF USER DATA AND CONTROL SIGNAL IN IP NETWORK
(NODE B INVOLVED IN SOFT HANDOVER HAS NO SELECTIVE
SYNTHESIS FUNCTION)

RADIO ACCESS NETWORK APPARATUS AND MOBILE COMMUNICATION SYSTEM USING THE SAME

BACKGROUND OF THE INVENTION

1. Field of the Invention

The present invention relates to a radio access network apparatus and a mobile communication system using it, and more particularly to an improvement of a Radio Network Controller (RNC) in a W-CDMA cellular mobile communication system.

2. Description of the Prior Art

An architecture of a W-CDMA communication system that is a mobile communication system is shown in FIG. 11. A radio access network (RAN) 1 is configured with radio network controllers (RNC) 4, 5 and Nodes B6 to 9, and is connected with a core network (CN) 3 as an exchange network via an Iu interface. The Nodes B6 to 9 are logical nodes for radio transmission/reception, and more specifically radio base station apparatus.

An interface between the Node B and RNC is referred to as Iub, and Iur interface is also standardized as an interface between RNCs. Each Node B covers one or more cells 10 and is connected to a mobile unit (UE) 2 via a radio interface. The Node B terminates a radio line, and the RNC manages the Node B and selectively synthesizes radio paths in the case of soft handover. Note here that the detail of the architecture shown in FIG. 11 is specified in 3GPP (3rd Generation Partnership Projects).

FIG. 12 shows a protocol architecture for the radio interface in the W-CDMA communication system shown in FIG. 11. As shown in FIG. 12, such protocol architecture is composed of three protocol layers of a physical layer (PHY) 11 denoted as L1, data link layers 12 to 14 denoted as L2, and a network layer (RRC: Radio Resource Control) 15 denoted as L3.

The data link layers L2 are separated into three sublayers of a MAC (Media Access Control) layer 12, a RLC (Radio Link Control) layer 13, and a BMC (Broadcast/Multicast Control) layer 14. The MAC layer 12 has a MAC-c/sh (common/share) 121 and a MAC-d (dedicated) 122, and the RLC layer 13 has a plurality of RLCs 131 to 134.

Ellipses in FIG. 12 indicate service access points (SAP) between layers or sublayers, where SAPs between the RLC sublayer 13 and the MAC sublayer 12 provide logical channels. That is, the logical channels are provided from the MAC sublayer 12 to the RLC sublayer 13, and are classified by functions and logical properties of transmission signals and characterized by transferred information contents.

The logical channels include a CCCH (Common Control Channel), a PCCH (Paging Control Channel), a BCCH (Broadcast Control Channel), and a CTCH (Common Traffic Channel), for example.

A SAP between the MAC sublayer 12 and the physical layer 11 provides transport channels, which are provided from the physical layer 11 to the MAC sublayer 12. The transport channels are classified by a transmission form and are characterized depending on how and what information is transmitted via a radio interface.

The transport channels include a PCH (Paging Channel), a DCH (Dedicated Channel), a BCH (Broadcast Channel), and a FACH (Forward Access Channel), for example.

The physical layer 11 and the sublayers 12 to 14 in the data link layer are controlled by the network layer (RRC) 15 via a C-SAP providing a control channel. The detail of the protocol architecture shown in FIG. 12 is specified in TR25.925 of 3GPP.

In addition, a C (Control) plane for signaling that transfers a control signal and a U (User) plane that transfers user data, are specified in TR 25.925. The BMC sublayer 14 in L2 is applied only to the U plane.

The RNCs 4, 5 of the radio access network (RAN) 1 in the prior art are apparatus in which both functions of controlling the C plane and U plane are physically integrated.

In a mobile communication system including such a RNC that integrally has the control functions of both U plane and C plane, the control function of the C plane is sufficient enough to be added in order to enhance the signaling processing capacity, however, the RNC itself is required to be added. Furthermore, although the control function of the U plane is sufficient enough to be added in order to increase the transfer speed of user data, the RNC itself is required to be added as well. Therefore, the conventional RNC constitution makes constructing a system abundant in scalability quite difficult.

Moreover, the following disadvantage arises in soft handover. When a UE (mobile unit) is in a usual setup status, one Radio Link is connected between the RNC and Node B, and when the UE is moved and comes into a soft handover status, two or more paths are connected between the RNC and a plurality of Nodes B. When the UE comes into the soft handover across RNCs, a path is connected utilizing an interface referred to as Iur (see FIG. 11) between a serving RNC and a drift RNC.

In such a status of soft handover across RNCs, a path for user data may be connected from one U plane control function unit to a plurality of Nodes B involved in soft handover, however, another path for the user data needs to be connected between the serving RNC and the drift RNC, wasting resources and causing delay due to passing through the RNCs.

BRIEF SUMMARY OF THE INVENTION

It is therefore an object to provide a radio access network apparatus capable of constructing a system abundant in scalability and a mobile communication system using the same.

Another object of the present invention is to provide a radio access network apparatus which eliminates waste of resources and prevents delay in the case of soft handover, and a mobile communication system using the same.

According to the present invention, the radio access network apparatus is provided between a mobile terminal and a host device having an switching network in the mobile communication system and is connected with the mobile terminal via a radio interface. The radio access network apparatus comprises user plane controlling means for controlling transfer of user data in relation to the mobile terminal and control plane controlling means for controlling transfer of signaling having a control signal, both of which are physically separated from each other.

The user plane controlling means has a function of terminating a data link layer of a protocol for the radio interface, and the control plane controlling means has a function of terminating a network layer of a protocol for the radio interface. The user data is transferred between the mobile terminal and the host device via the data link layer of the user plane controlling means, and the signaling is transferred via the data link layer of the user plane controlling means and the network layer of the control plane controlling means.

Furthermore, the radio access network apparatus further comprises a radio base station having a function of terminating a physical layer of a protocol for the radio interface. The user plane controlling means further includes means for selecting data of high receiving quality from among the user data coming from a plurality of radio base stations involved in a soft handover state and sending out the selected data to the host device. Moreover, the user plane controlling means is incorporated into the radio base station. The mobile communication system belongs to a W-CDMA cellular system.

The mobile communication system according to the present invention includes the radio access network apparatus described above.

DETAILED DESCRIPTION OF THE PREFERRED EMBODIMENTS

Figure 1:
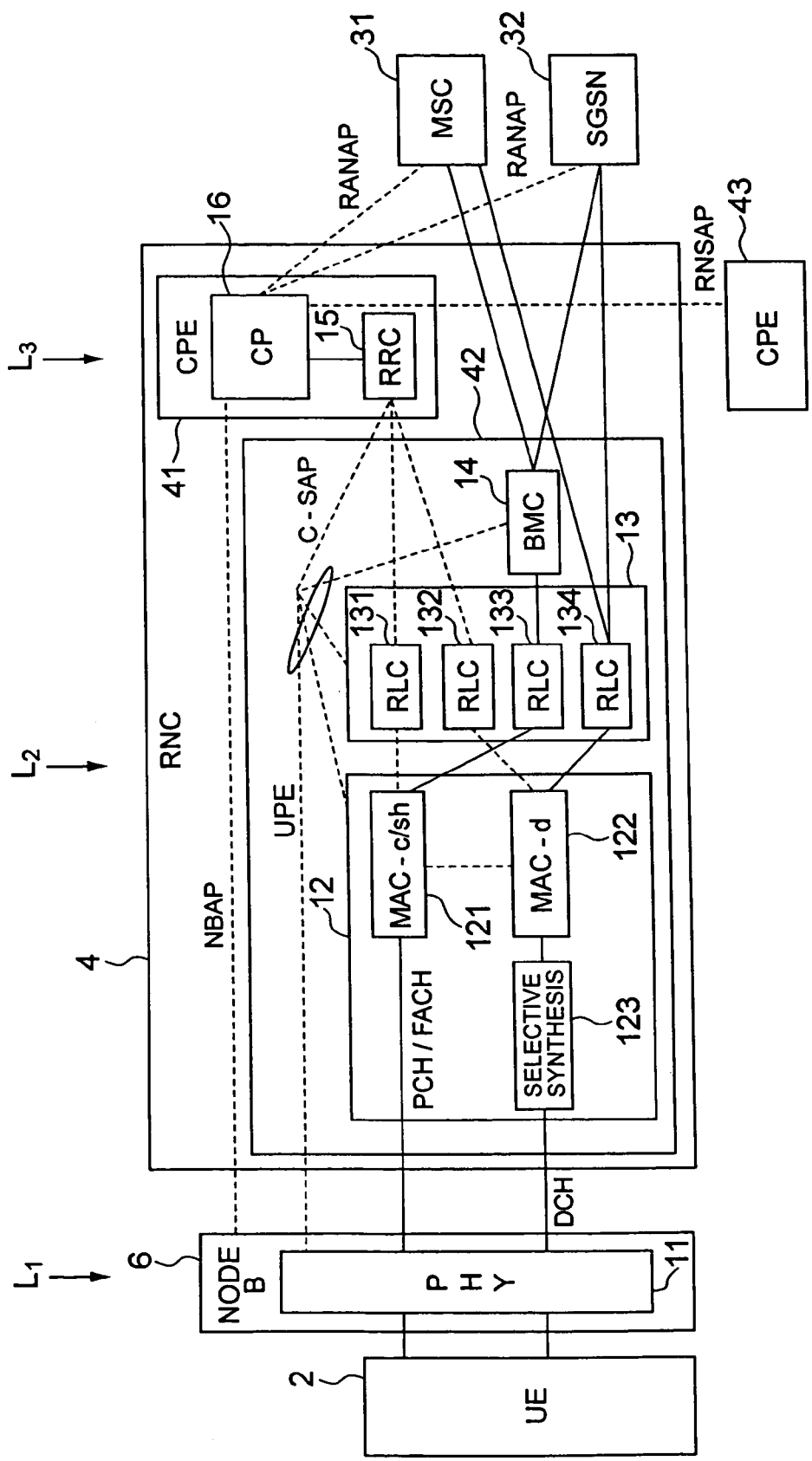
FIG. 1 is a functional block diagram according to an embodiment of the present invention.
Figure 12:
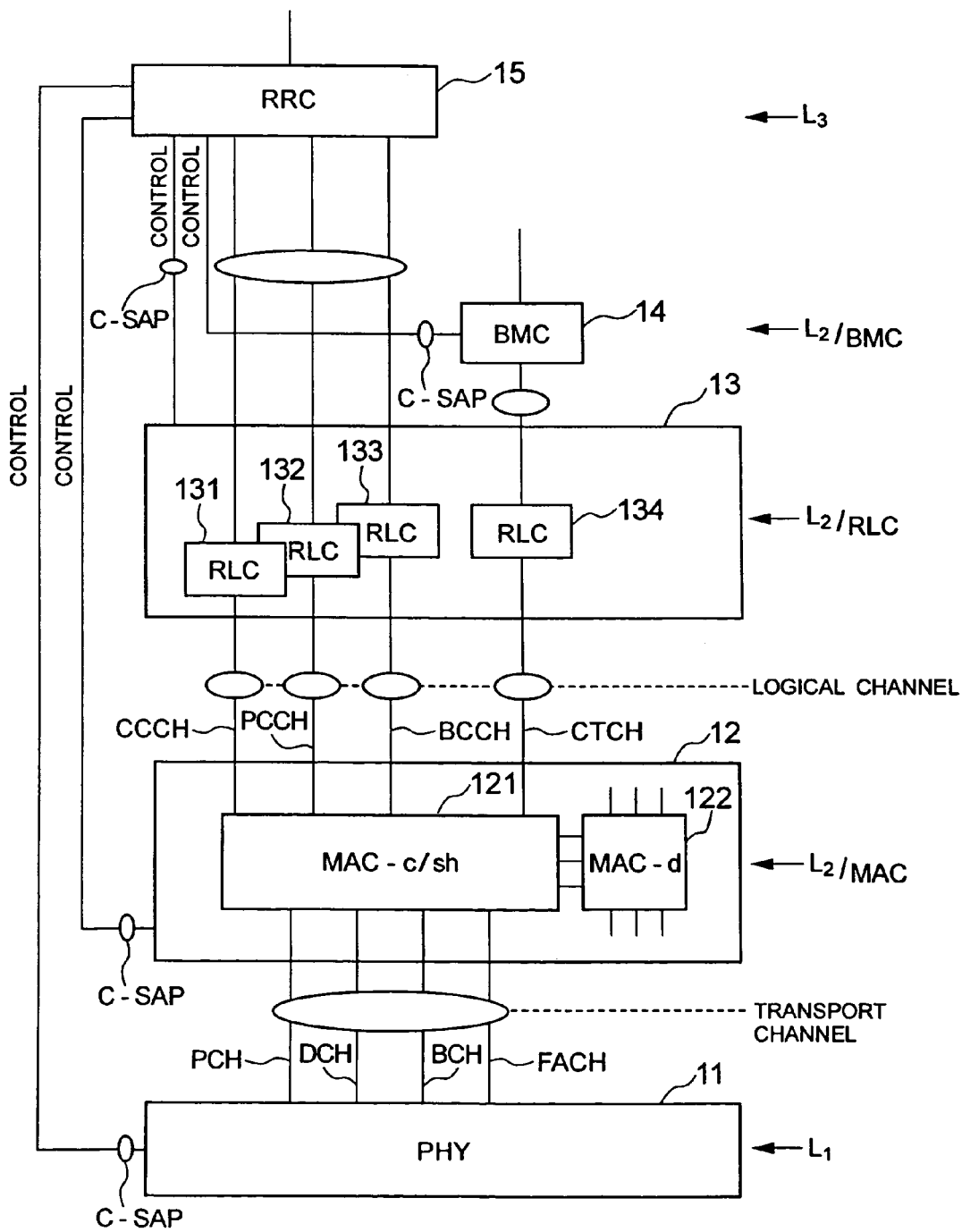
FIG. 12 is a diagram showing the system architecture in FIG. 11 as a protocol architecture.

The embodiments of the present invention will be described below with reference to the drawings. FIG. 1 is a functional block diagram of the embodiment according to the present invention, where the same parts as in FIG. 12 are indicated with the same reference numerals and characters. As shown in FIG. 1, a RNC 4 is physically separated into a C plane control equipment (CPE: Control Plane Equipment) 41 equivalent to a C plane for controlling signaling and a U plane control equipment (UPE: User Plane Equipment) 42 equivalent to a U plane for controlling user data.

All kinds of signaling between units are communicated directly with a central control processor (CP: Control Processor) 16 provided in the C plane control equipment 41. However, RRC signaling between a mobile unit (UE) 2 and the RNC 4 cannot be distinctly separated into the C plane and U plane, so is transferred to a RRC 15 in the C plane control equipment 41 after the U plane control equipment 42 terminates RLCs 131 and 132.

In this manner, layers in the existing protocol layer architecture of the RNC shown in FIG. 12 are separated into a Node B (radio base station apparatus) 6 for the physical layer (PHY) 11 denoted as L1, a U plane control equipment 42 for the data link layers 12 to 14 denoted as L2, and a C plane control equipment 41 for the network layer 15 and above denoted as L3.

The RRC 15 in the C plane control equipment 41 controls each unit for terminating the physical layer 11 in the Node B and a MAC layer 12, a RLC layer 13, and a BMC layer 14 in the U plane control equipment 42, by means of C-SAPs (Control Service Access Point) providing control channels. Signaling NBAP between the Node B 6 and the RNC 4, signaling RNSAP between the RNC 4 and a C plane control equipment (CPE) 43 in another RNC, and signaling RANAP between the RNC 4 and a MSC (Mobile Switching Center) 31 or an SGSN (Serving GPRS (Global Packet Radio Service) Switching Node) 32, are terminated and processed directly by the CP 16 in the C plane control equipment 41.

Figure 11:
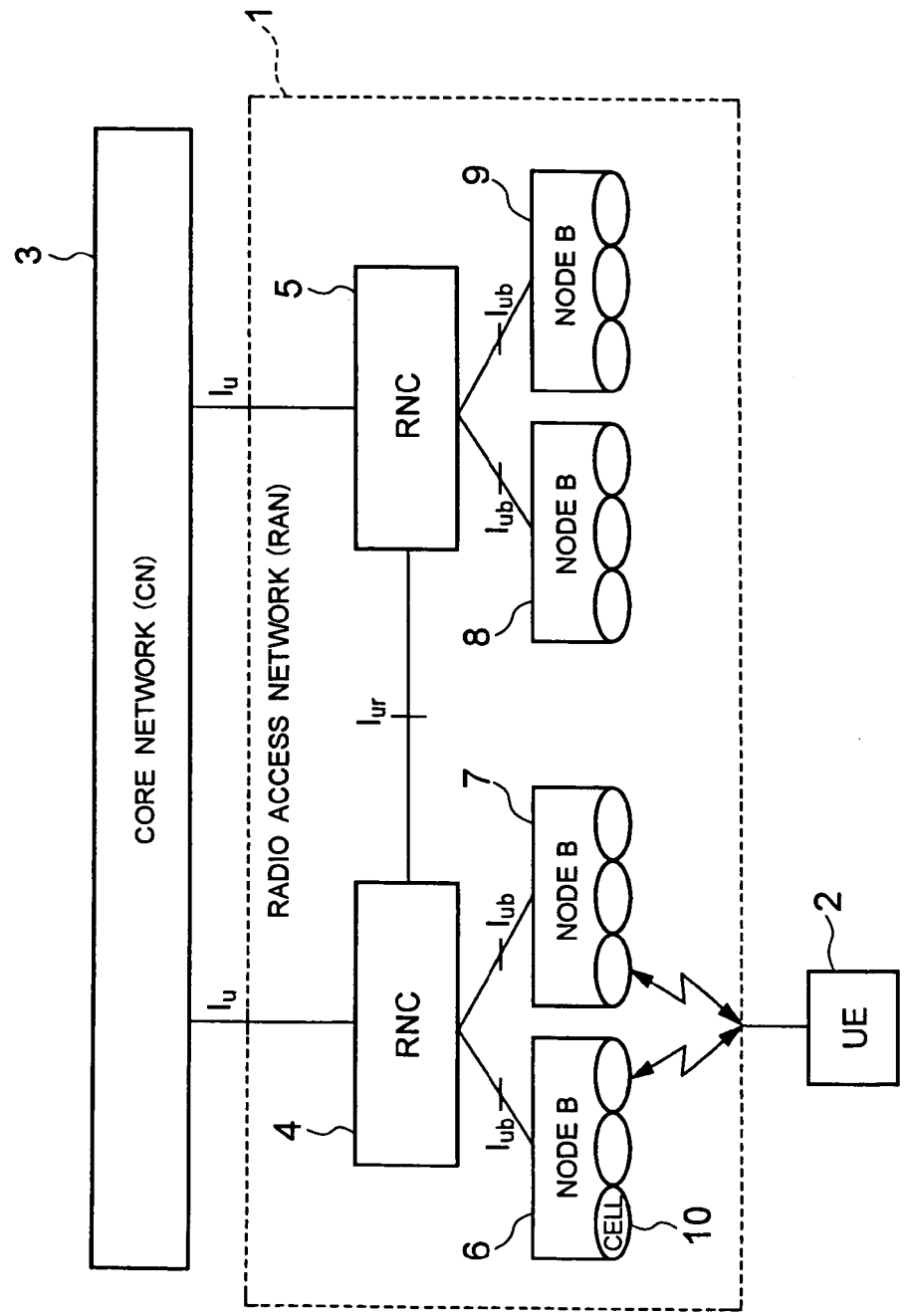
FIG. 11 is a diagram showing a system architecture in a W-CDMA communication system.

Note that the MSC 31 has a circuit switching function and that the SGSN 32 has a packet switching function, both of which are included in the core network (CN) 3 shown in FIG. 11.

The RRC signaling utilized between the RNC 4 and the mobile unit 2 is transferred from the mobile unit 2 via the Node B 6 and the MAC layer 12 and RLC layer 13 in the U plane control equipment 42, and is terminated in the RRC layer 15 in the C plane control equipment 41. PCH/FACH is terminated in the MAC-c/sh layer 121 and the RLC layer 13 in the U plane control equipment 42 and is transmitted to the C plane control equipment 41, since the relation between the Node B 6 and the U plane control equipment 42 is determined after Logical O&M procedure (Logical O&M is the signaling associated with the control of resources owned by the RNC but physically implemented in the Node B, and is specified in 3GPP Specification (25.401)) and is not changed as far as station data is not changed.

DCH (Dedicated Channel) for transmitting user data allows the connection between the arbitrary Node B and the U plane control equipment 42, and is terminated in the MAC-d layer 122 and the RLC layer 13 to be transmitted to the MSC 31 having a circuit switching function and the SGSN 32 having a packet switching function through the C plane control equipment 41, after paths between Nodes B are selectively synthesized in a selective synthesis unit 123 of the U plane control equipment 42.

The selective synthesis unit 123 selectively synthesizes DCHs from a plurality of Nodes B in the case of soft handover, and selects a link having the highest link quality (receiving quality) from among these Nodes B.

The apparatus configuration shown in FIG. 1 allows to construct a system abundant in scalability. That is, only the C plane control equipment 41 is added in order to enhance signaling processing capacity, and only the user plane control equipment 42 is added in order to increase user data transfer speed. Units in the user plane control equipment 42 have no relation with one another and are controlled by the RRC 15 in the C plane control equipment 41, which thus enables implementation thereof as a single unit.

Figure 2:
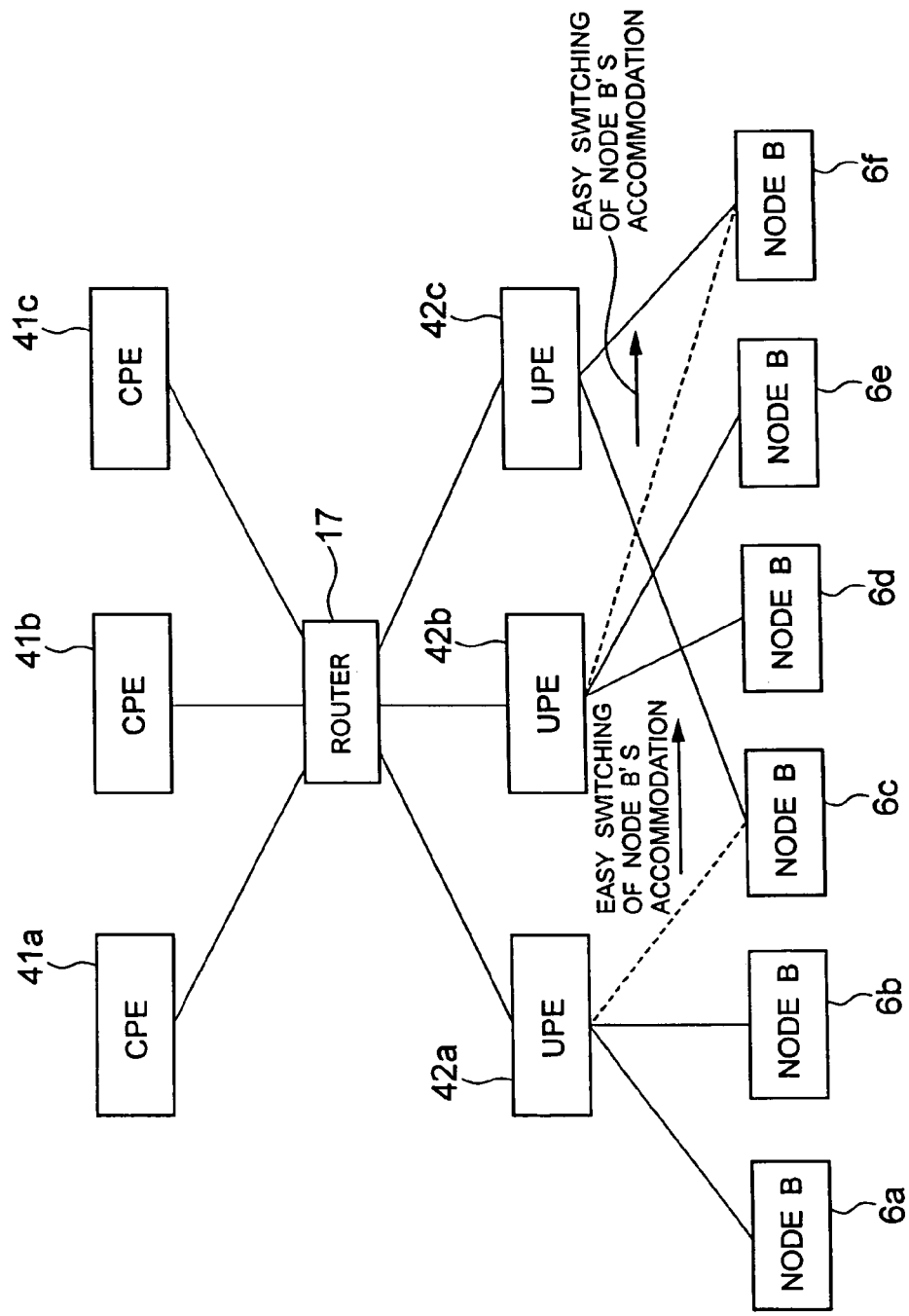
FIG. 2 is a diagram illustrating advantages of the embodiment of the present invention.

FIG. 2 is a diagram showing scalability secured between the C plane control equipment (CPE) and the U plane control equipment (UPE) separated from each other according to the embodiment of the present invention. The C plane control equipments 41a to 41c and the U plane control equipments 42a to 42c are interconnected via a device 17 such as an IP router or a hub. The C plane control equipment and the U plane control equipment are conventionally integrated as a single RNC unit, therefore the RNC itself is required to be added for extension. However, the C plane control equipment, which performs signaling processing such as call processing, has the possibility of lacking processing capacity with increasing call quantity. In this case, by adding a new C plane control equipment, processing may easily be dispersed.

For example, in the case that two C plane control equipments 41a, 41b are utilized, an algorithm such that the C plane control equipment 41a is used when a mobile unit has the terminal number whose last one digit is an even number and the C plane control equipment 41b is used when a mobile unit has the terminal number whose last one digit is an odd number, is altered by utilizing three C plane control equipments 41a to 41c into another algorithm such that the C plane control equipment 41a is used when the last one digit of the terminal number is 0, 1, 2, or 3, the C plane control equipment 41b is used when the last one digit is 4, 5, or 6, and the C plane control equipment 41c is used when the last one digit is 7, 8, or 9. This allows easy enhancement of processing capacity by 1.5 times.

On the other hand, the U plane control equipment, which performs transfer of user data, has the possibility of lacking processing capacity with increasing quantity of transmitting/receiving data to/from each mobile unit. In this case, by adding a new U plane control equipment, processing may easily be dispersed. For example, the constitution of connecting three out of Nodes B6a to 6f in subordination to each of two U plane control equipments 42a, 42b is changed so as to connect two out of the Nodes B6a to 6f in subordination to each of three U plane control equipments 42a, 42b, and 42c, which allows an increase of the transfer speed by 1.5 times.

Figure 3:
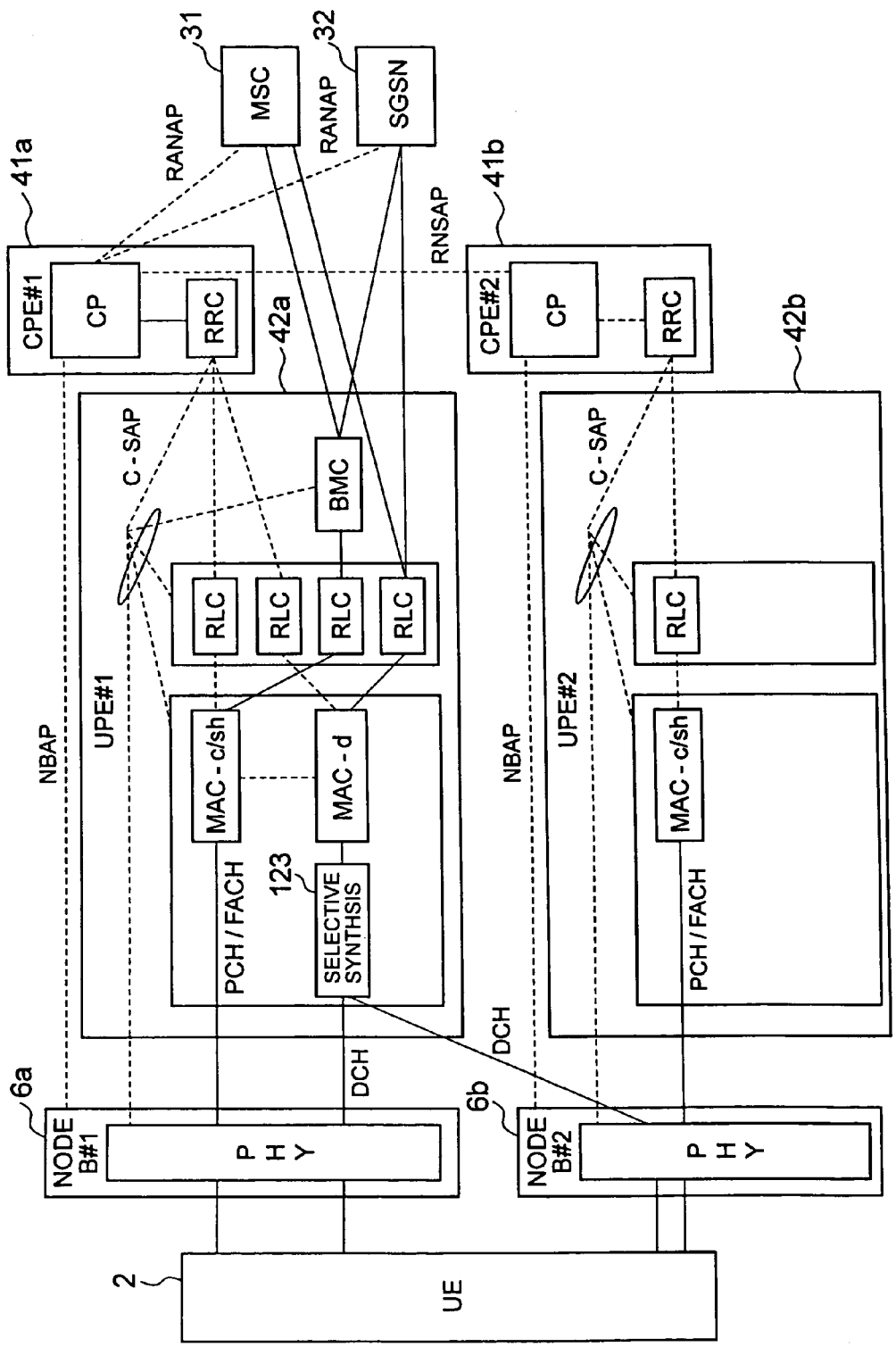
FIG. 3 is a diagram illustrating a status during soft handover when the embodiment of the present invention is employed.

FIG. 3 is a diagram showing that the terminal UE 2 as a mobile unit is performing soft handover operation between the Node B6a and Node B6b. The DCH is connected to the terminal 2 from both the Nodes B6a and 6b. By selective synthesis in the selective synthesis unit 123 of the U plane control equipment 42a, a link having higher link quality is selected from the Nodes B6a and 6b for transmission to the host device.

Figure 4:
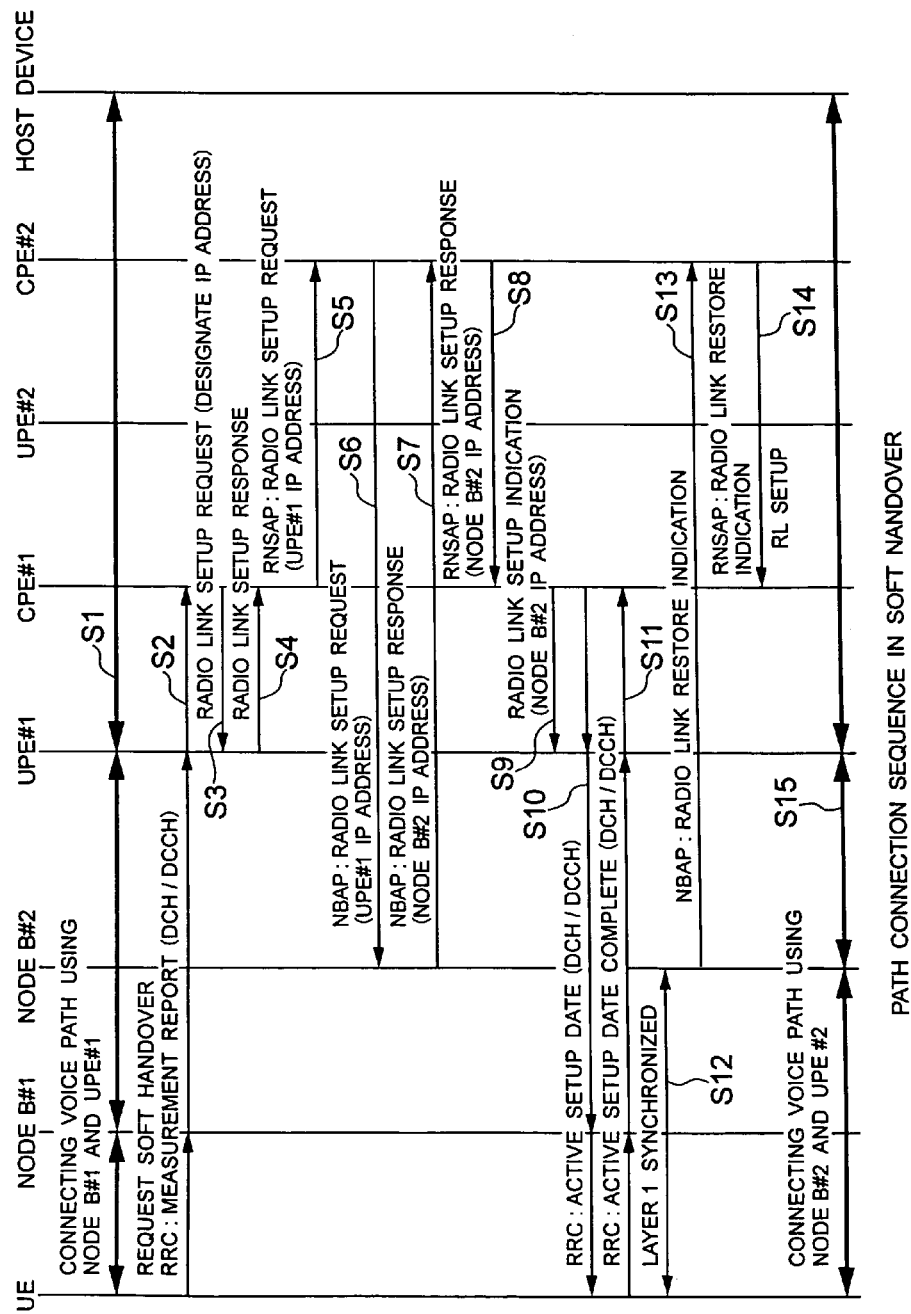
FIG. 4 is a diagram showing a path connection sequence in the case of soft handover according to the embodiment of the present invention.

FIG. 4 shows a sequence from the state that the terminal UE as a mobile unit is executing voice communication utilizing the Node B#1 (6a) and the U plane control equipment (UPE) #1 (42a) (step S1), going through the soft handover requesting between the terminal UE and the Nodes B#2 (6b), to the connection of a path between the terminal UE and the Node B#2. The C plane control equipment (CPE)#1 (41a) manages resources of the U plane control equipment #1 and the Node B#1, and the C plane control equipment #2 (41b) manages resources of the U plane control equipment #2 (42b) and the Node B#2.

A soft handover request is notified as "MESUREMENT REPORT (RRC)" from the terminal UE to the C plane control equipment #1 via the Node B#1 and the U plane control equipment #1 (step S2). The C plane control equipment #1 obtains an IP address for soft handover in regard to the U plane control equipment #1 and notifies the U plane control equipment #1 of the IP address together with "RADIO LINK SETUP REQUEST" (step S3). The U plane control equipment #1 responds to the C plane control equipment #1 by "RADIO LINK SETUP RESPONSE" (step S4).

Next, the C plane control equipment #1 transmits the IP address of the U plane control equipment #1 obtained for soft handover together with "RADIO LINK SETUP REQUEST (RNSAP)" to the C plane control equipment #2 managing the Node B#2 as a moving destination (step S5). The C plane control equipment #2 transmits the IP address of the U plane control equipment #1 obtained for soft handover together with "RADIO LINK SETUP REQUEST (NBAP)" to the Node B#2 (step S6).

The Node B#2 notifies the C plane control equipment #2 of an IP address of the Nodes B#2 together with "RADIO LINK SETUP RESPONSE (NBAP)" (step S7). Next, the C plane control equipment #2 notifies the C plane control equipment #1 of the IP address of the Node B#2 together with "RADIO LINK SETUP RESPONSE (RNSAP)" (step S8). The C plane control equipment #1 notifies the U plane control equipment #1 of the IP address of the Node B#2 by "RADIO LINK SETUP INDICATION" (step S9).

By these procedures, the IP address of the Node B#2 is notified to the U plane control equipment #1, and the IP address of the U plane control equipment #1 is notified to the Node B#2, thereby allowing the transmission/reception of user data. At the same time, the C plane control equipment #1 notifies the terminal UE of "ACTIVE SET UPDATE (RRC)" (step S10). Then, the terminal UE notifies the C plane control equipment #1 of "ACTIVE SET UPDATE COMPLETE (RRC)" (step S11) after which radio synchronization is started between the terminal UE and the Node B#2 (step 12).

After the layer 1 (L1) synchronization for the radio line between the terminal UE and the Node B#2 is completed, "RADIO LINK RESTORE INDICATION (NBAP)" is notified from the Node B#2 to the C plane control equipment #2 (step S13). The C plane control equipment #2 transmits "RADIO LINK RESTORE INDICATION (RNSAP)" to the C plane control equipment #1 (step S14), after which the path is completely established between the terminal UE and the Node B#2. Consequently, paths for soft handover connected to one U plane control equipment #1 from the Nodes B#1 and #2 are established (step S15).

Thus, in the case of soft handover across RNCs, by connecting paths from one U plane control equipment to a plurality of Nodes B without establishing a path between a drift RNC and a serving RNC for user data, soft handover may be achieved, which enables the continuous use of the same U plane control equipment and thus eliminates the path between RNCs, thereby leading to effective utilization of resources and preventing delay due to passing through the RNCs.

Next, a conceivable modification is such that the RNC is separated into the C plane control equipment and the U plane control equipment and that the U plane control equipment is incorporated into the Node B. In this case, if the U plane control equipment incorporated into the Node B does not have the function of selectively synthesizing user data (the selective synthesis unit 123 in FIG. 1), soft handover via a plurality of Nodes B is not executable. This means unenjoyment of merits of utilizing CDMA within radio zones. It is thus conceivable to provide each Node B with the function of selectively synthesizing user data to realize communication between Nodes B.

Figure 5:
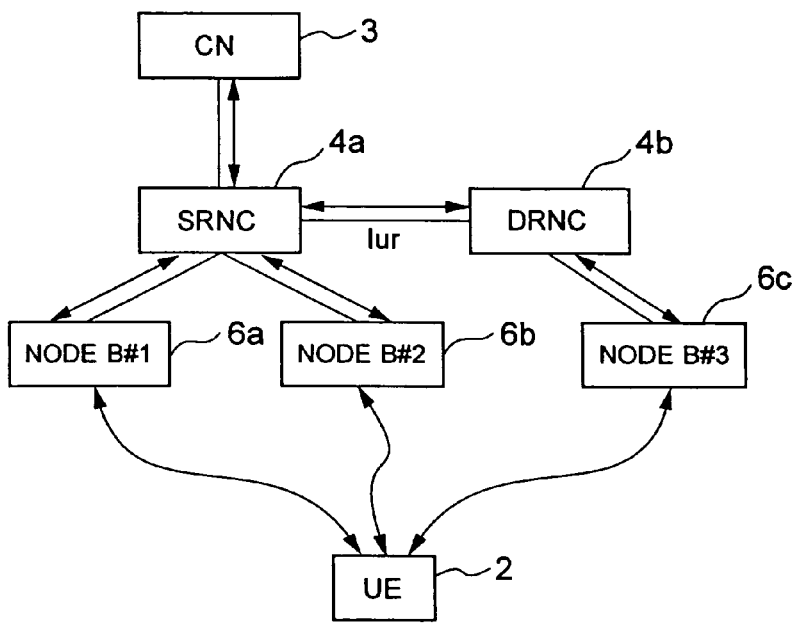
FIG. 5 is a diagram showing the existing (conventional) network configuration and a flow of user data and control signals.

FIG. 5 shows the conventional network configuration and a flow of user data and control signals. In this network configuration, when soft handover is performed involving plural Nodes B6a to 6c, an SRNC (Serving RNC) 4a terminates user data and control signals. When soft handover is performed involving plural RNCs, user data and control signals are transferred from the SRNC 4a to a DRNC (Drift RNC) 4b via an interface Iur.

Figure 6:
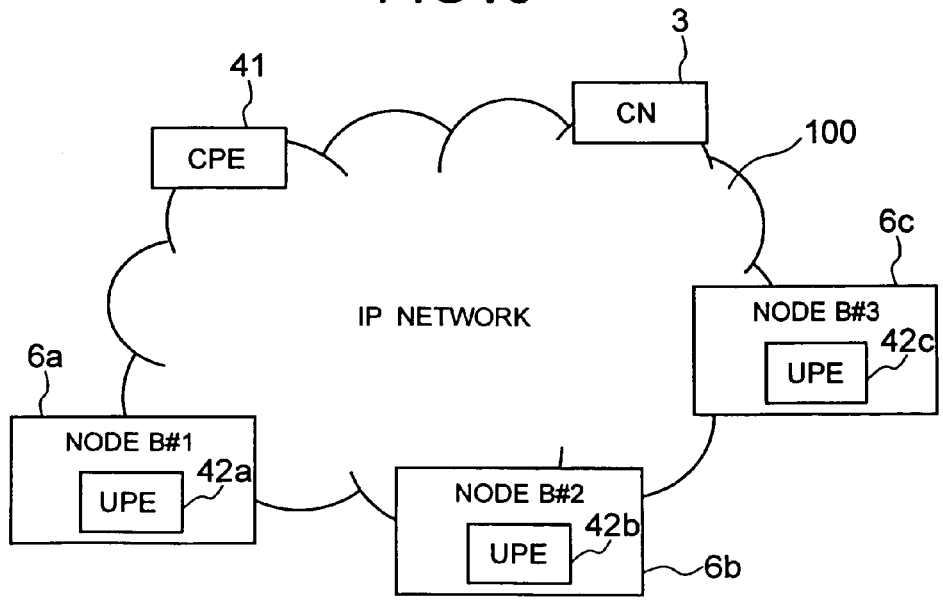
FIG. 6 is a diagram showing a network configuration of IP network employing the embodiment of the present invention.

FIG. 6 shows a network configuration in the case that the RNC is separated into the C plane control equipment 41 and the U plane control equipment 42 and that the U plane control equipments 42a to 42c are incorporated into the Nodes B6a to 6c, respectively. The Nodes B 6a to 6c, the C plane control equipment 41, the CN 3 are connected with one another via an IP network 100.

Next, shown is how soft handover involving plural Nodes B is executed in the IP network shown in FIG. 6. It is assumed here that the C plane control equipment 41 is notified IP addresses of the Nodes B.

Figure 7:
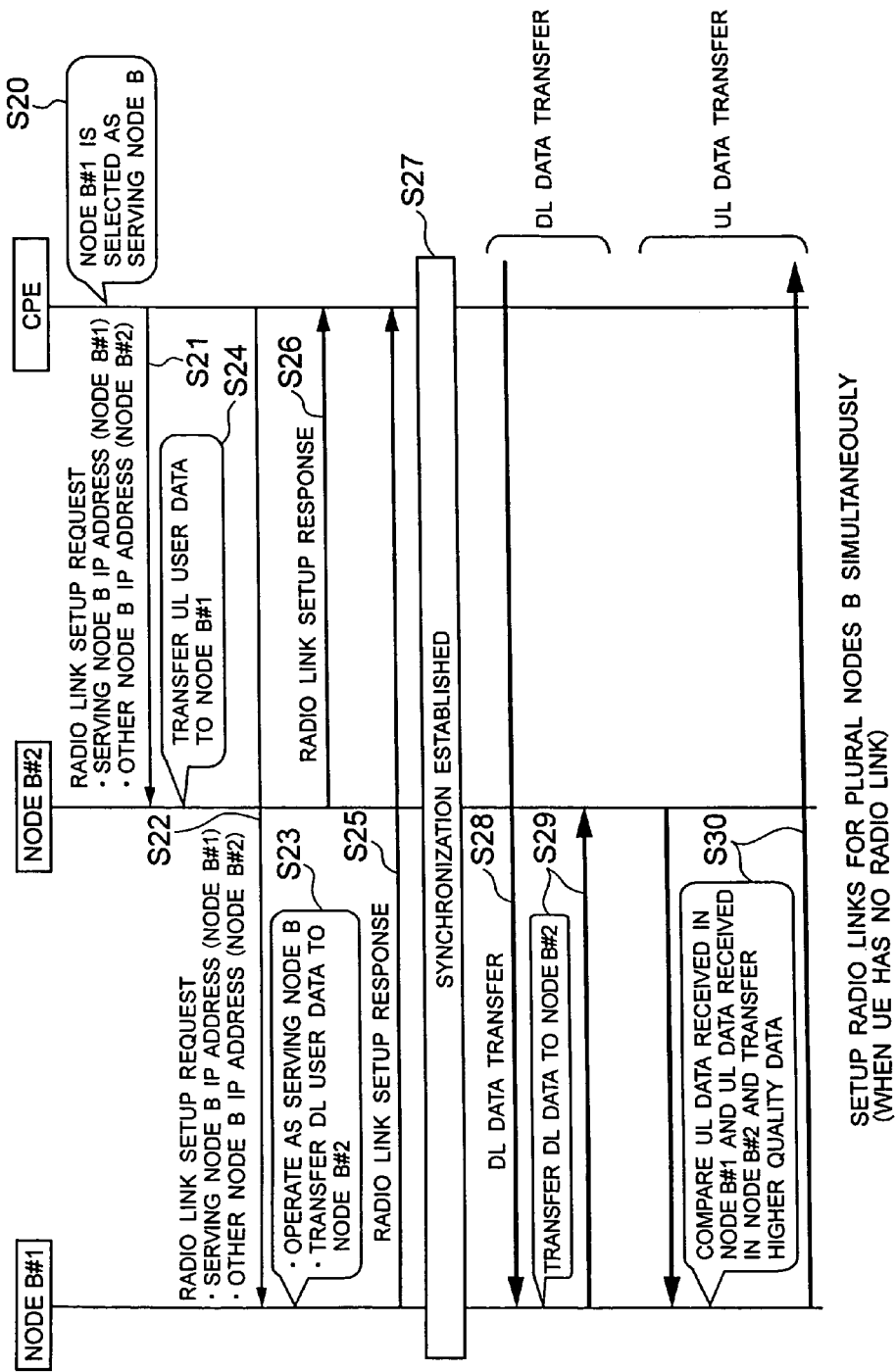
FIG. 7 is a sequence diagram in the case that radio links are setup for a plurality of Nodes B at the same time according to the embodiment of the present invention.

FIG. 7 shows an example of setting a radio link (RL) via two Nodes B from a state in which the terminal UE has no radio link (RL). The C plane control equipment (CPE) selects a Node B (Node B#1 in FIG. 7) as a serving Node from among a plurality of Nodes B (Node B#1 and Node B#2 in FIG. 7) (step S20). The C plane control equipment notifies both the Nodes B of an IP address of the serving Node B (Node B#1 in FIG. 7) and an IP address of the other Node B (Node #2 in FIG. 7) so as to indicate the difference of the IP addresses therebetween by means of "RADIO LINK SETUP REQUEST" massage (steps S21 and S22).

The C plane control equipment designates a Node B controlling cells of the highest quality as a serving Node B. Both the Nodes B compare their own IP addresses to the IP address of the serving Node B, and when such own IP address is the same as that of the serving Node B, the Node B having the same IP address recognizes itself as the serving Node B (step S22). Nodes B other than that recognize the IP address of the serving Node B as a transfer destination for UL (Up Link) data (step S24).

Each Node B secures resources necessary for setting up a radio link, and then returns "RADIO LINK SETUP RESPONSE" message to the C plane control equipment (steps S25 and S26), thereafter establishing the synchronization of the U plane (step S27).

In the case of DL (Down Link) data transfer (step S28), the serving Node B transfers data to the IP address of the other Node B notified in the "RADIO LINK SETUP REQUEST" massage (step S29). In the case of UP (Up Link) data transfer, the serving Node B compares data received from each Node B with one another and transfers data of the highest quality to the host (step S30).

Figure 8:
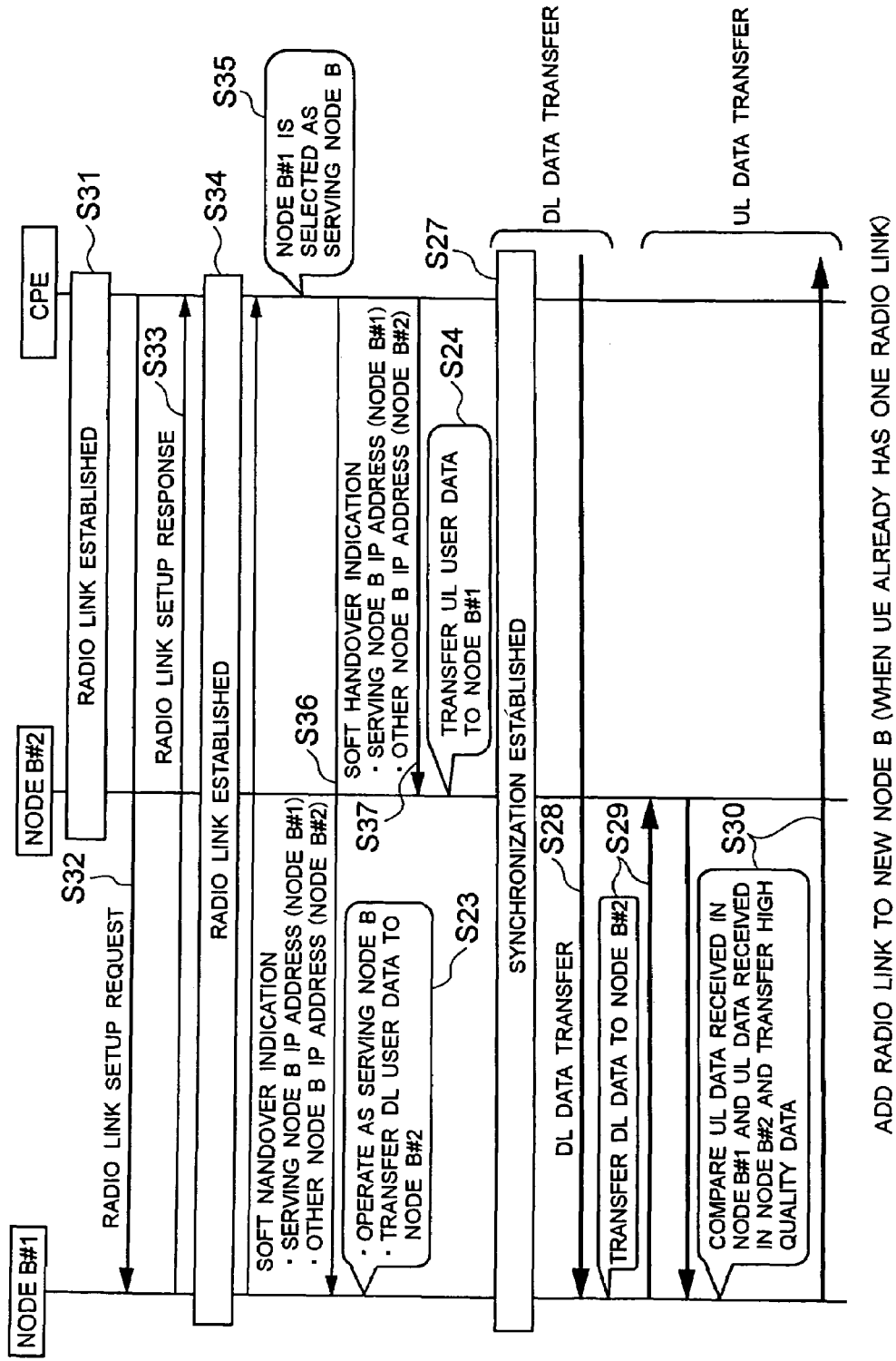
FIG. 8 is a sequence diagram when the radio link is additionally setup for a new Node B according to the embodiment of the present invention.

FIG. 8 shows an example from a state that the mobile unit already has a radio link to a state that the mobile unit comes into soft handover condition by adding a radio link via a new Node B. In this case, the Node B having a radio link already set up (Node B#2 in FIG. 8) (step S31) needs to be notified of an IP address of a serving Node B and IP addresses of Nodes B involved in soft handover.

First, a radio link is setup (step S34) for a new Node B (Node B#1 in FIG. 8) by means of "RADIO LINK SETUP REQUEST" massage (step S32) and "RADIO LINK SETUP RESPONSE" message (step S33), and then all the Nodes B involved in soft handover are notified of the IP address of the serving Node B and IP addresses of Nodes B involved in soft handover.

As means for the above, a new massage of "SOFT HANDOVER INDICATION" should be proposed (steps S36 and S37). This massage includes the IP address of the serving Node B and IP addresses of Nodes B involved in soft handover. Operations thereafter is the same as those in FIG. 7, so are indicated with the same reference numerals and characters.

FIGS. 7 and 8 show examples of soft handover involving two Nodes B, however, two or more Nodes B involved in soft handover are also applicable to the above mechanism. In this case, plural IP addresses are set as "OTHER NODE B IP ADDRESS" in steps 21 and 22 of FIG. 7 and in steps 36 and 37 of FIG. 8.

Figure 9:
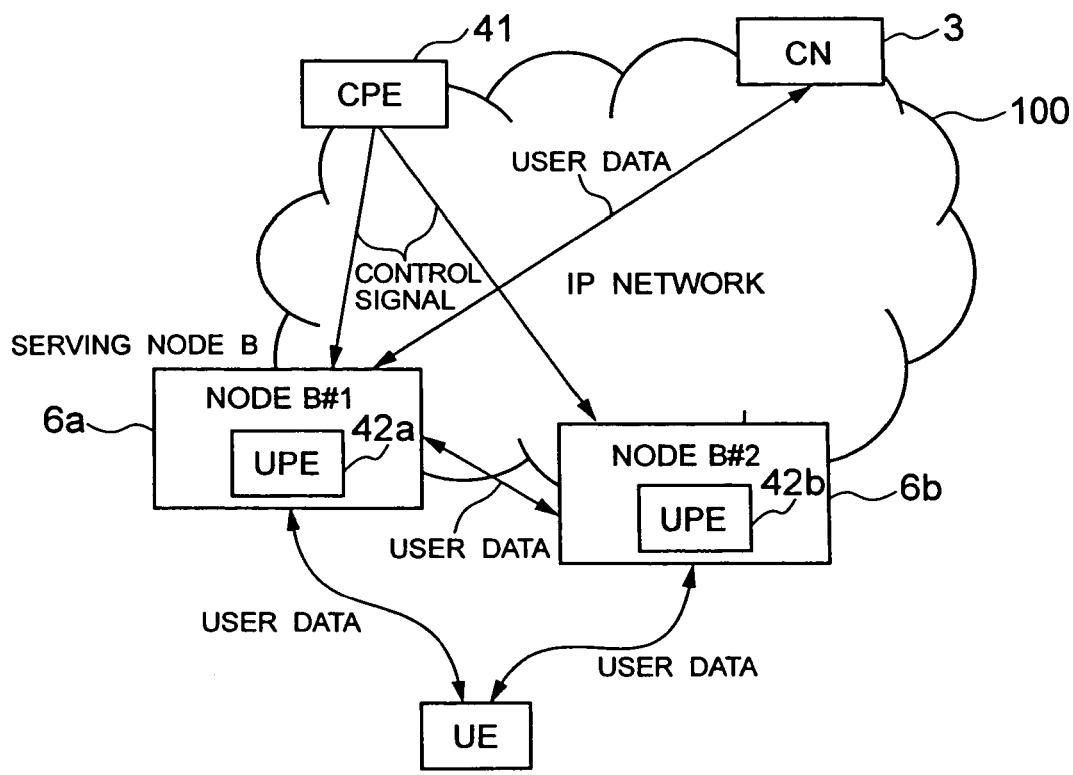
FIG. 9 is a diagram showing one example of a flow of user data and control signals in the IP network according to the embodiment of the present invention.

FIG. 9 shows a flow of user data and control signals in the IP network 100. FIG. 9 corresponds to the sequences in FIGS. 7 and 8.

The example of providing selective synthesis function to each Node B is described above, although such installation of the selective synthesis function to the Node B raises a problem of increasing the production cost of the Node B. To solve the problem, it is conceivable to provide the selective synthesis function to only one Node B out of plural Nodes B. In this case, user data is terminated in the Node B having such selective synthesis function at the time of soft handover via plural Nodes B. This may result in maintained soft handover function which is an advantageous feature of CDMA.

Figure 10:
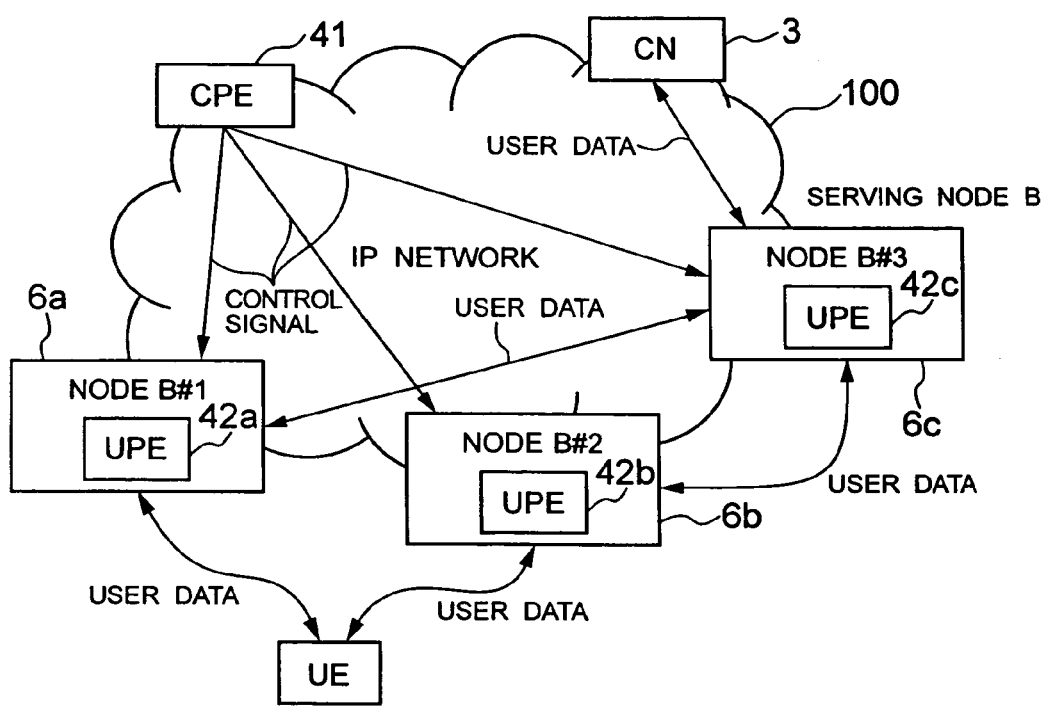
FIG. 10 is a diagram showing another example of a flow of user data and control signals in the IP network according to the embodiment of the present invention.

FIG. 10 shows a flow of user data and control signals in the IP network 100 in the case that the Node B#1 and the Node B#2 are involved in soft handover but neither of them has the selective synthesis function. In FIG. 10, a Node B#3 (6c) has the selective synthesis function.

To realize such processing, the CN 3 is necessary to have IP addresses, locations, the presence of the selective synthesis function, load status, and the like, of all Nodes B within the IP network 100. In the example of FIG. 10, the CN 3 notifies the Nodes B#1 and #2 of an IP address of a serving Node B, and the Nodes B#1 and #2 transfer data to the serving Node B. The CN 3 also instructs the Nodes B#3 to function as a serving.

When selecting the serving Node B from Nodes B other than those involved in soft handover, the CN 3 takes account of physical distances between the Nodes B involved in soft handover and the Node B working as the serving Node, and load status of the Nodes B targeted for the serving.

As described in the above, according to the present invention, a RNC is physically separated into a C plane control equipment as a signaling control unit and a U plane control equipment as a user data processing unit, thus allowing a system abundant in scalability to effectively be constructed. In addition, each unit in the U plane control equipment has no relation with one another, enabling separate installation.

Furthermore, even in the case of soft handover across the C plane control equipments, the same U plane control equipment may be continuously utilized, which eliminates the conventional path between RNCs and thus effectively prevents delay due to passing through the RNCs.

Moreover, even in the case that the Node B has the function of terminating user data which is performed in the present RNC and that such Node B is connected to an IP network, by providing a selective synthesis function for user data to a predetermined Node B, soft handover involving a plurality of Nodes B may effectively be achieved.

What is claimed is:

1. A mobile communications system comprising:
   a control plane controller;
   a user plane controller; and
   a radio base station apparatus connected to a mobile terminal by radio,
   wherein said control plane controller manages said user plane controller,
   said control plane controller is physically separated from said user plane controller, and
   said user plane controller is physically incorporated into said radio base station apparatus.

2. The mobile communications system according to claim 1, wherein said user plane controller comprises a radio link control (RLC) layer that controls a radio link.

3. The mobile communications system according to claim 2, wherein said user plane controller further comprises a broadcast/multicast control (BMC) layer that controls broadcast or multicast.

4. The mobile communications system according to claim 2, wherein said plane controller further comprises a selective synthesis unit that synthesizes radio paths selectively.

5. The mobile communications system according to claim 1, further comprising a mobile terminal.

6. The mobile communications system of claim 1, further comprising:
an IP router;
wherein the control plane controller is connected to said user plane controller and other user plane controllers by the IP router.

7. The mobile communications system of claim 6, wherein the control plane controller is configured such that, when the control plane controller receives a soft handover request from a user plane controller of the plurality of user plane controllers, the control plane controller obtains an IP address for soft handover in regard to the user plane controller and notifies the user plane controller of the IP address.

8. The mobile communications system of claim 1, further comprising:
a hub;
wherein the control plane controller is connected to said user plane controller and other user plane controllers by the hub.

9. The mobile communication system according to claim 1, wherein user data is terminated in said radio base station apparatus.

10. The mobile communication system according to claim 1, wherein said radio base station apparatus has a function of selectively synthesizing user data to communicate with another base station apparatus.

11. The mobile communications system according to claim 1, wherein said user plane controller comprises a media access control (MAC) layer that controls a media access.

12. A mobile communications system comprising:
a plurality of control plane controllers; and
a user plane controller,
wherein said plurality of control plane controllers manage said user plane controller, and
wherein said user plane controller is configured such that, when said user plane controller is communicating with a first control plane controller of said plurality of control plane controllers and said first control plane controller performs a handover to a second control plane controller of said plurality of control plane controllers, said user plane controller communicates with said second control plane controller after the handover has been completed.

13. The mobile communication system according to claim 12, wherein said plurality of control plane controllers are physically separated from said user plane controller.

14. The mobile communication system according to claim 12, wherein said plurality of control plane controllers comprises a control processor, and a radio resource control (RRC) layer that controls a radio resource.

15. The mobile communication system according to claim 12, wherein said user plane controller comprises a radio link control (RLC) layer that controls a radio link, and a media access control (MAC) layer that controls a media access.

16. The mobile communication system according to claim 15, wherein said user plane controller further comprises a broadcast/multicast (BMC) layer that controls broadcast or multicast.

17. The mobile communication system according to claim 15, wherein said user plane controller further comprises a selected synthesis unit that synthesizes radio paths selectively.

18. The mobile communications system according to claim 12, further comprising a mobile terminal.

19. The mobile communications system of claim 12, further comprising:
an IP router;
wherein the plurality of control plane controllers are connected to the user plane controller by the IP router.

20. The mobile communications system of claim 12, further comprising:
a hub;
wherein the plurality of control plane controllers are connected to the user plane controller by the hub.

21. A user plane controller comprising:
a radio link control (RLC) layer that controls a radio link;
a media access control (MAC) layer that controls a media access,
wherein said user plane controller is managed by a control plane controller,
said control plane controller is physically separated from said user plane controller, and
said user plane controller is physically incorporated into a radio base station apparatus connected to a mobile terminal by radio.

22. The user plane controller according to claim 21, further comprising a broadcast/multicast (BMC) layer that controls broadcast or multicast.

23. The user plane controller according to claim 21, further comprising a selective synthesis unit that synthesizes radio paths selectively.

24. A mobile communications system comprising:
a plurality of control plane controllers; and
a user plane controller,
wherein said plurality of control plane controllers manage said user plane controller,
wherein the plurality of control plane controllers are configured to allow a plurality of mobile terminals to perform call processing;
wherein each mobile terminal of the plurality of mobile terminals has a terminal number; and
wherein a particular control plane controller of the plurality of control plane controllers that performs call processing for a particular mobile terminal of the plurality of mobile terminals is selected from among the plurality of control plane controllers based on one or more digits of the terminal number of the particular mobile terminal.

25. A mobile communications system, comprising:
a radio network controller that is physically separated into a control plane controller for controlling signaling and a user plane controller for processing user data;
wherein the user plane controller is configured such that, when user data is transferred between a mobile terminal and a host device through the user plane controller, the user data is transferred by only the user plane controller and a host device by the user plane controller, and
wherein the control plane controller and the user plane controller are configured such that a control signal is able to be terminated by both the control plane controller and the user plane controller.

26. The mobile communication system comprising:
a control plane controller;
a plurality of user plane controllers; and
a plurality of radio base station apparatuses,
wherein said control plane controller manages said plurality of user plane controllers,
wherein said control plane controller is physically separated from said plurality of user plane controllers, wherein each of said plurality of user plane controllers is incorporated into each of said plurality of said radio base station apparatuses, and wherein at least one of said plurality of said radio base station apparatuses has a function to selectively synthesize user data to communicate with another one of said plurality of said radio base station apparatuses.

27. A base station apparatus connected to a mobile terminal by radio, comprising:

a user plane controller that controls a user data, wherein said user plane controller is physically separated from a control plane controller, and wherein said user plane controller is physically incorporated into said base station apparatus.

28. The base station apparatus according to claim 27, wherein said user plane controller comprises a radio link control (RLC) layer that controls a radio link.

29. The base station apparatus according to claim 28, wherein said base station apparatus terminates the user data.

30. The mobile communications system according to claim 28, wherein said user plane controller comprises a media access control (MAC) layer that controls a media access.

31. The base station apparatus according to claim 30, wherein said RLC layer and said MAC layer terminate the user data.

32. The station apparatus according to claim 27, wherein said base station apparatus selectively synthesizes the user data.

33. The station apparatus according to claim 27, wherein said base station apparatus controls transfer of said user data.

* * * * *